(12) United States Patent
Natarahjan et al.

(10) Patent No.: US 10,089,189 B2
(45) Date of Patent: Oct. 2, 2018

(54) DEVICES AND METHODS FOR RECEIVING A DATA FILE IN A COMMUNICATION SYSTEM

(71) Applicant: MOTOROLA SOLUTIONS, INC., Schaumburg, IL (US)

(72) Inventors: Harish Natarahjan, Hoffman Estates, IL (US); Graeme Peter Johnson, Plantation, FL (US); Daniel J. McDonald, Cary, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/130,498

(22) Filed: Apr. 15, 2016

(65) Prior Publication Data

US 2017/0300389 A1 Oct. 19, 2017

(51) Int. Cl.
*G06F 11/14* (2006.01)
*H04W 76/15* (2018.01)
(Continued)

(52) U.S. Cl.
CPC ........ *G06F 11/1464* (2013.01); *H04L 1/0048* (2013.01); *H04W 76/025* (2013.01); *H04W 76/15* (2018.02); *G06F 2201/84* (2013.01)

(58) Field of Classification Search
CPC .................................................. G06F 11/1464
See application file for complete search history.

(56) References Cited

U.S. PATENT DOCUMENTS

| | | | | |
|---|---|---|---|---|
| 4,297,737 A | * | 10/1981 | Andresen | G11B 5/59655 360/135 |
| 5,210,660 A | * | 5/1993 | Hetzler | G11B 20/10 360/48 |

(Continued)

FOREIGN PATENT DOCUMENTS

| | | |
|---|---|---|
| EP | 0959635 | 11/1999 |
| WO | 2016022982 | 2/2016 |

OTHER PUBLICATIONS

Examination Report from the Canadian Patent and Trademark Office for Application No. 2,963,039 dated Jan. 31, 2018 (4 pages).

(Continued)

*Primary Examiner* — Joseph D Torres
(74) *Attorney, Agent, or Firm* — Michael Best & Friedrich LLP

(57) ABSTRACT

Devices and methods for receiving a data file in a communication system. In one embodiment, the wireless communication device includes a transceiver, a memory, and an electronic processor. The transceiver is configured to send and receive data over a wireless communication network. The electronic processor is electrically coupled to the transceiver and the memory and configured to receive, with the transceiver, a first seed, a sequence of blocks, and a subsequent seed, cause the memory to save the sequence of blocks in the memory, and determine whether the subsequent seed is aligned with the first seed. When the subsequent seed is not aligned with the first seed, the electronic processor is configured to cause the memory to delete the sequence of blocks. When the subsequent seed is aligned with the first seed, the electronic processor is configured to cause the memory to maintain the sequence of blocks.

18 Claims, 9 Drawing Sheets

(51) Int. Cl.
*H04L 1/00* (2006.01)
*H04W 76/02* (2009.01)

(56) References Cited

U.S. PATENT DOCUMENTS

| | | | | |
|---|---|---|---|---|
| 5,515,369 | A * | 5/1996 | Flammer, III | H04B 1/7143 370/480 |
| 5,729,735 | A * | 3/1998 | Meyering | G06F 11/1451 |
| 6,307,487 | B1 | 10/2001 | Luby | |
| 6,320,712 | B1 * | 11/2001 | DeForest | G11B 5/59605 360/48 |
| 6,327,105 | B1 * | 12/2001 | DeForest | G11B 5/59605 360/48 |
| 6,718,122 | B1 * | 4/2004 | Ishii | H04N 9/79 386/264 |
| 7,230,549 | B1 * | 6/2007 | Woodral | G06F 13/4217 341/100 |
| 7,590,090 | B1 * | 9/2009 | Horn | H04B 7/18584 370/329 |
| 7,792,230 | B1 * | 9/2010 | Gallagher | G06F 11/1687 375/354 |
| 7,983,301 | B2 | 7/2011 | Li | |
| 8,385,374 | B1 * | 2/2013 | Wohlgemuth | H04L 25/14 370/464 |
| 8,566,632 | B2 * | 10/2013 | van de Burgt | G06F 1/12 709/233 |
| 9,621,768 | B1 * | 4/2017 | Lyon | H04N 5/00 |
| 2002/0108091 | A1 * | 8/2002 | Flanagin | G06F 17/30575 714/798 |
| 2003/0147532 | A1 * | 8/2003 | Hakkarainen | H04H 60/23 380/239 |
| 2003/0193900 | A1 * | 10/2003 | Zhang | H04L 65/607 370/252 |
| 2004/0044919 | A1 * | 3/2004 | Dabral | H04L 7/005 713/400 |
| 2005/0102598 | A1 | 5/2005 | Shokrollahi | |
| 2006/0047463 | A1 * | 3/2006 | Sivaram | H04L 43/50 702/120 |
| 2006/0056097 | A1 * | 3/2006 | Hashimoto | G11B 5/455 360/75 |
| 2012/0210190 | A1 | 8/2012 | Luby et al. | |
| 2014/0028282 | A1 * | 1/2014 | Perry | G01R 19/0092 324/76.11 |
| 2014/0207386 | A1 * | 7/2014 | Jung | G06F 19/22 702/20 |
| 2014/0337684 | A1 | 11/2014 | Resch et al. | |

OTHER PUBLICATIONS

First Office Action from the Australian Intellectual Property Office for Application No. 2017202338 dated Mar. 29, 2018 (8 pages).

* cited by examiner

DEVICES AND METHODS FOR RECEIVING A DATA FILE IN A COMMUNICATION SYSTEM

BACKGROUND OF THE INVENTION

Fountain codes (for example, Luby Transform (LT) codes, raptor codes, and online codes) are a class of codes that do not have a fixed code rate and exhibit a property that an original message can be recovered from a subset of encoding symbols.

Communication systems that use fountain codes may include an encoder and a decoder. The encoder encodes data blocks into communication blocks or packets using a pseudorandom number generator. The encoder transmits the communication blocks or packets to the decoder over a communication channel. The decoder decodes the received communication blocks or packets using a pseudorandom number generator. Generally, the pseudorandom number generators in the encoder and decoder are synchronized.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
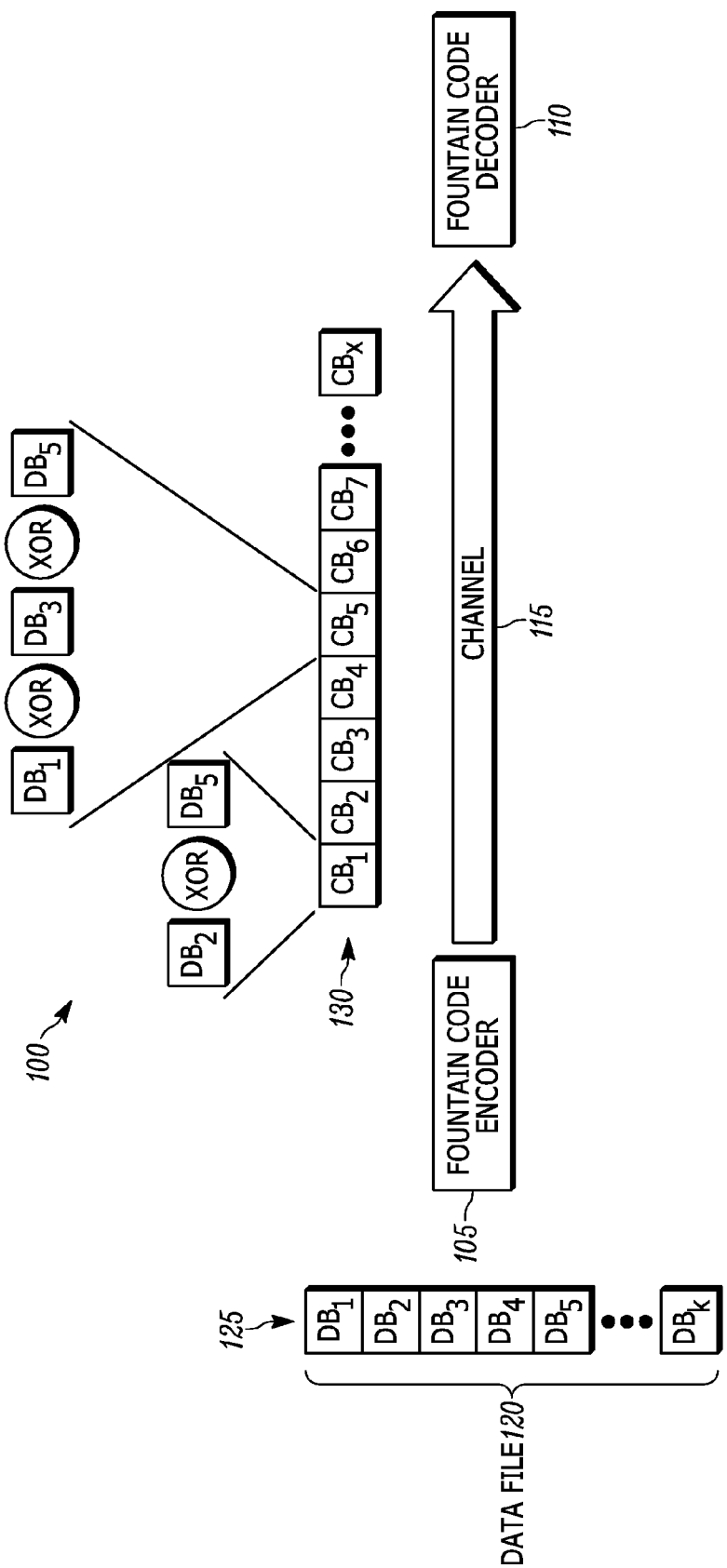
FIG. 1 is a diagram of a communication system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment provides a wireless communication device for receiving a data file in a communication system. The wireless communication devices comprising a transceiver, a memory, and an electronic processor. The transceiver is configured to send and receive data to and from a wireless communication network. The electronic processor is configured to receive, with the transceiver, a first seed, receive, with the transceiver, a sequence of blocks, cause the memory to save the sequence of blocks in the memory, receive, with the transceiver, a subsequent seed, determine whether the subsequent seed is aligned with the first seed, when the subsequent seed is not aligned with the first seed, cause the memory to delete the sequence of blocks, and when the subsequent seed is aligned with the first seed, cause the memory to maintain the sequence of blocks.

Another embodiment provides a wireless communication device for receiving a data file in a communication system. The wireless communication device comprising a transceiver, a memory, and an electronic processor. The transceiver is configured to send and receive data to and from a wireless communication network. The electronic processor is configured to receive, with the transceiver, a first seed over the wireless communication network, receive, with the transceiver, a first sequence of blocks and a second sequence of blocks transmitted over the wireless communication network, and cause the memory to save the first sequence of blocks and the second sequence of blocks. The electronic processor is also configured to receive, with the transceiver, a second subsequent seed over the wireless communication network, identify whether the second subsequent seed was transmitted after a first subsequent seed that was not received at the wireless communication device, determine whether the second subsequent seed aligns with the first seed, and, when the second subsequent seed does not align with the first seed, cause the memory to delete the first sequence of blocks and the second sequence of blocks from the memory. When the second subsequent seed does align with the first seed, the electronic processor is also configured to cause the memory to maintain the first sequence of blocks and the second sequence of blocks in the memory.

Yet another embodiment provides a method of receiving a data file with a wireless communication device in a communication system. The method includes receiving, at a transceiver of a wireless communication device, a first seed transmitted over a wireless communication network. The method also includes receiving, at the transceiver, a sequence of blocks transmitted over the wireless communication network. The method also includes saving, in a memory of the wireless communication device, the sequence of blocks. The method also includes receiving, at the transceiver, a subsequent seed transmitted over the wireless communication network. The method also includes determining, with an electronic processor of the wireless communication device, whether the subsequent seed aligns with the first seed. When the subsequent seed does not align with the first seed, the method also includes deleting the sequence of blocks from the memory. When the subsequent seed does align with the first seed, the method also includes maintaining the sequence of blocks in the memory.

Another embodiment provides a method of receiving a data file with a wireless communication device in a communication system. The method includes receiving, at a transceiver of a wireless communication device, a first seed over a wireless communication network. The method also includes receiving, at the transceiver, a first sequence of blocks and a second sequence of blocks transmitted over the wireless communication network. The method also includes saving, in a memory of the wireless communication device, the first sequence of blocks and the second sequence of blocks. The method also includes receiving, at the transceiver, a second subsequent seed over the wireless communication network. The method also includes identifying, with an electronic processor of the wireless communication device, whether the second subsequent seed was transmitted after a first subsequent seed that was not received at the wireless communication device. The method also includes determining, with the electronic processor, whether the second subsequent seed aligns with the first seed. When the second subsequent seed does not align with the first seed, the method also includes deleting the first sequence of blocks and the second sequence of blocks from the memory. When the second subsequent seed does align with the first seed, the method also includes maintaining the first sequence of blocks and the second sequence of blocks in the memory.

FIG. 1 illustrates an example of a system that uses fountain codes. Specifically, FIG. 1 illustrates a communication system 100 that operates using fountain codes. The communication system 100 includes a fountain code encoder 105, a fountain code decoder 110, a channel 115, and a data file 120 (for example, a data file). The fountain code encoder 105 segments the data file 120 into a plurality of data blocks 125 (for example, k data blocks). The fountain code encoder 105 generates a plurality of communication blocks 130 (for example, x communication blocks) using a pseudorandom number generator. The pseudorandom number generator generates, at random, a degree d, 1≤d≤k for each of the plurality of communication blocks 130. The fountain code encoder 105 uses the degree d and the pseudorandom number generator to randomly select exactly d unique data blocks 125 from the data file 120. The fountain code encoder 105 combines the selected d data blocks 125 (for example, using an exclusive-or (XOR) operation) to form each of the plurality of communication blocks 130. In one example, the pseudorandom number generator generates at random a degree d of two for a first communication block ($CB_1$). The fountain code encoder 105 uses the degree of two and the pseudorandom number generator to select a second data block ($DB_2$) and a fifth data block ($DB_5$) at random. Continuing the example, a first communication block ($CB_1$) is formed from the bit-wise exclusive-or (XOR) combination of the second data block ($DB_2$) and the fifth data block ($DB_5$). Similarly, the pseudorandom number generator generates, at random, a degree d of five for a fifth communication block ($CB_5$). The fountain code encoder 105 uses the degree of five and the pseudorandom number generator to select a first data block ($DB_1$), a third data block ($DB_3$), and a fifth data block ($DB_5$) at random. The fifth communication block ($CB_5$) is formed from the bit-wise exclusive-or (XOR) combination of the first data block ($DB_1$), the third data block ($DB_3$), and the fifth data block ($DB_5$). The degree d generated by the pseudorandom number generator for each of the plurality of communication blocks is the seed associated with each of the plurality of communication blocks.

The fountain code encoder 105 transmits the plurality of communication blocks 130 to the fountain code decoder 110 via the channel 115. The fountain code encoder 105 appends a cyclic redundancy check (CRC) over the communication blocks 130 and may optionally encode the plurality of communication blocks 130 with a forward error correction code (for example, a convolutional code) prior to transmitting it over the channel 115. The fountain code decoder 110 first performs appropriate forward error correction decoding (for example, convolutional decoding) if this optional encoding was applied in the fountain code encoder 105. Then, the fountain code decoder 110 determines the validity of each received communication block of the plurality of communication blocks 130 (for example, by computing a cyclic redundancy check over the received communication block and comparing the computed cyclic redundancy check to the transmitted cyclic redundancy check). The fountain code decoder 110 discards the communication blocks of the plurality of communication blocks 130 that are in error. The fountain code decoder 110 identifies the data blocks 125 that are included in each valid communication block of the plurality of communication blocks 130 using a pseudorandom number generator. For each of the plurality of communication blocks 130, the pseudorandom number generator in the fountain code decoder 110 draws one random number to determine the degree d and then subsequently draws d unique random numbers which represent the numbers of the data blocks 125 included in each communication block of plurality the communication blocks 130. Eventually, the fountain code decoder 110 receives enough valid communication blocks of the plurality of communication blocks 130 to construct the data file 120.

The pseudorandom number generators in the fountain code decoder 110 and encoder 105 should be synchronized. In some communication systems, the fountain code encoder 105 transmits a synchronization pattern (for example, a seed value used to generate a sequence of random numbers) along with each communication block of the plurality of communication blocks 130 to the fountain code decoder 110 to maintain synchronization. The fountain code encoder 105 may also transmit a synchronization pattern (for example, an intermediate seed value from the generation of the sequence of random numbers) periodically to allow decoders that may have missed the initial synchronization pattern to synchronization to the encoded stream. Difficulties may arise in the fountain code decoder 110 when a synchronization pattern is not included in each communication block of the plurality of communication blocks 130. The fountain code decoder 110 needs the synchronization pattern to execute the random number draws for each communication block of the plurality of communication blocks 130 created by the fountain code encoder 105 to maintain synchronization with the fountain code encoder 105. This includes executing random number draws for missing or erroneous communication blocks of the plurality of communication blocks 130. However, including the synchronization pattern with each communication block of the plurality of communication blocks increases the overhead (for example, the size of each communication block) of each communication block in the plurality of communication blocks 130. As a consequence, the increase in the overhead also increases the number of communication blocks 130 to be transmitted by the fountain code encoder 105.

To avoid an increase in overhead, a synchronization pattern or seed may be sent periodically or at some other predetermined time instead of with each communication block. A fountain code receiving device may receive a first seed and a subsequent seed that aligns with the first seed. When the subsequent seed aligns with the first seed, then the communication blocks 130 received between the two seeds may be considered valid and used for their intended purposes. In addition to reducing overhead, a system that uses seed validation eliminates or reduces the need for the fountain code receiving device to perform random number draws for missing or erroneous communication blocks of the plurality of communication blocks 130.

Systems described herein may be used, in some examples, to distribute large data files (for example, a firmware upgrade file, an image file, or other large data file) in wireless communication systems with a large number of communication devices (for example, radios including land mobile radios, cellular telephones, or other suitable communication devices). In some embodiments, the wireless communication system is a relatively low-bandwidth wireless communication system (for example, an Association of Public Safety Communication Officials—Project 25 (APCO25) wireless communication system, a terrestrial trunked radio (TETRA) wireless communication system, a digital mobile radio (DMR) wireless communication system, or other relatively low-bandwidth wireless communication system).

Figure 2:
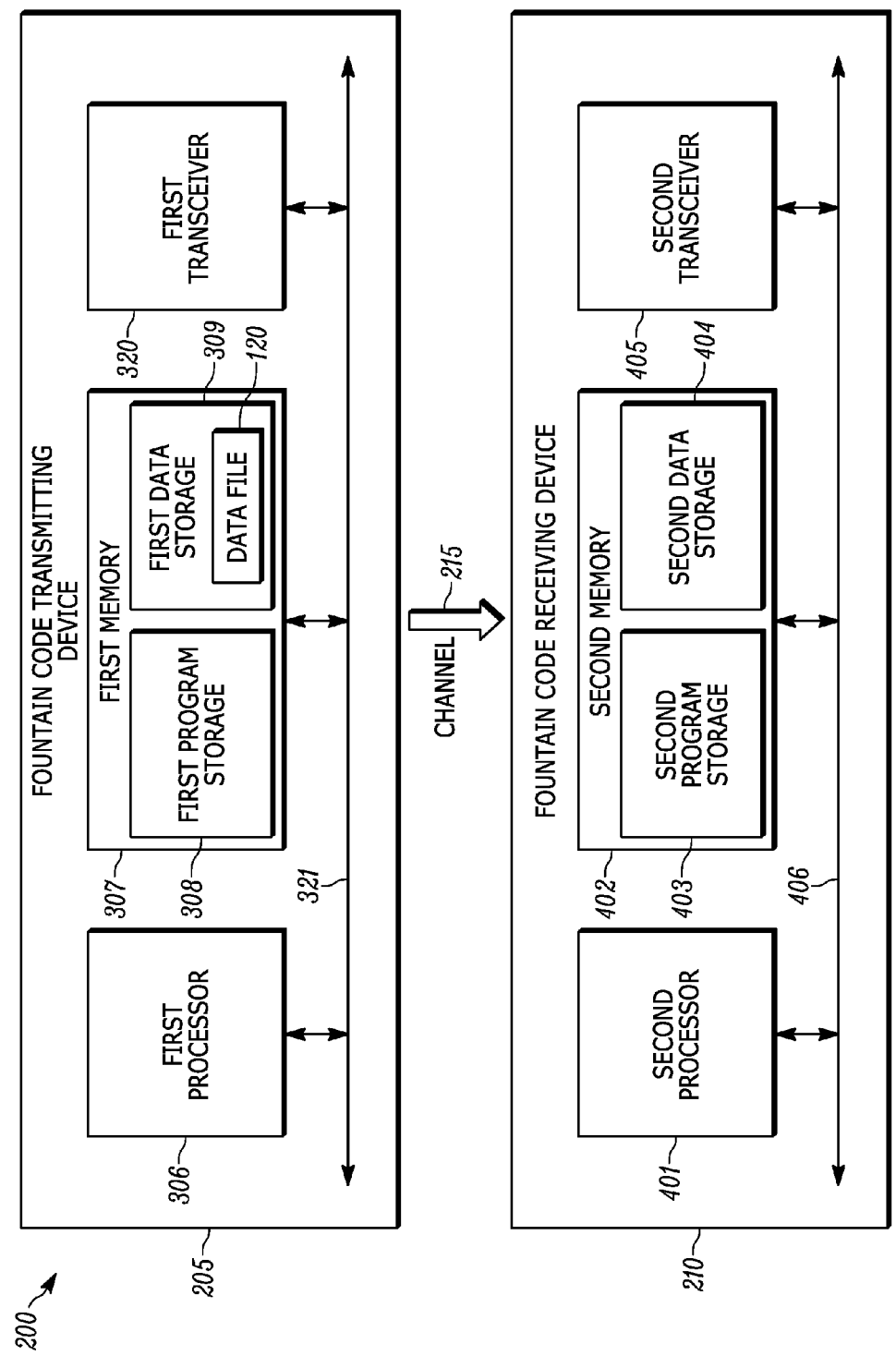
FIG. 2 is a block diagram of a fountain code system that communicates the data file of FIG. 1 in a relatively low-bandwidth wireless communication system.

FIG. 2 illustrates a fountain code system 200 that communicates the data file 120 of FIG. 1 in a relatively low-bandwidth wireless communication system. In the example illustrated, the fountain code system 200 includes a fountain code transmitting device 205 and a fountain code receiving device 210. The fountain code transmitting device 205 encodes a data file 120 data file into sequences of blocks and transmits the sequences of blocks to the fountain code receiving device 210 via a channel 215 (for example, a radio-frequency channel). The fountain code receiving device 210 receives some or all of the transmitted sequences of blocks and decodes data blocks from the received sequences of blocks to construct the data file 120.

In the illustrated embodiment, the fountain code transmitting device 205 includes, among other components, a first processor 306 (for example, an electronic processor, a microprocessor, a microcontroller, or other suitable device), a first memory 307, and a first transceiver 320. The first processor 306, the first memory 307, and the first transceiver 320 are communicatively coupled with one another via a first system bus 321. The fountain code transmitting device 205 may include additional or different components than those components illustrated in FIG. 2 and may be configured to perform additional functionality than the functionality described herein.

The first memory 307 includes, for example, a first program storage 308 and a first data storage 309. In some embodiments, the data file 120 is stored within the first data storage 309. The first program storage 308 and the first data storage 309 may include combinations of different types of memory, such as read only memory (ROM), random access memory (RAM) (for example, dynamic RAM [DRAM], synchronous DRAM [SDRAM], etc.), electrically erasable programmable read only memory (EEPROM), flash memory, a hard disk, an SD card, or other suitable magnetic, optical, physical, or electronic memory devices or data structures. The first processor 306 is connected to the first memory 307 and executes software instructions that are capable of being stored in a RAM of the first memory 307 (for example, during execution), a ROM of the first memory 307 (for example, on a generally permanent basis), or another non-transitory computer-readable medium such as another memory or a disc. Software included in some embodiments of the fountain code transmitting device 205 may be stored in the first memory 307. The software includes, for example, firmware, one or more applications, program data, filters, rules, one or more program modules, and other executable instructions. The first processor 306 is configured to retrieve from the first memory 307 and execute, among other things, instructions related to the control processes and methods described herein.

The first transceiver 320 sends and/or receives signals to and/or from one or more separate transceivers as described in greater detail below. Signals include, among other components information, data, serial data, and data packets (for example, the sequence of blocks 340). The first transceiver 320 may be coupled to one or more separate transceivers via the channel 215 (for example, wired connections, fiber optic connections, and/or wireless connections). Wireless communication may be implemented using various wireless network topologies known to those skilled in the art (for example, two-way digital radio topologies, cellular topologies, and other suitable topologies). Communication via wired and/or fiber optic connections may be implemented using various appropriate network topologies including networks using (for example, Ethernet or other suitable communication protocols).

In the embodiment illustrated, the fountain code receiving device 210 includes, among other components, a second processor 401 (for example, a microprocessor, a microcontroller, or other suitable programmable device), a second memory 402, and a second transceiver 405. The second processor 401, the second memory 402, and the second transceiver 405 are communicatively coupled with one another via a second system bus 406. The fountain code receiving device 210 may include additional or different components than those components illustrated in FIG. 2 and may be configured to perform additional functionality than the functionality described herein. In some examples, the fountain code receiving device 210 is a wireless communication device (for example, a land mobile radio, a cellular telephones, or other suitable wireless communication device). In other examples, the fountain code receiving device 210 is a wired communication device (for example, a server or other suitable wired communication device). In yet other examples, the fountain code receiving device 210 is both a wireless communication device and a wired communication device.

The second memory 402 includes, for example, a second program storage 403 and a second data storage 404. The second program storage 403 and the second data storage 404 may include combinations of different types of memory, including the various types of memory discussed above. The second memory 402 may maintain and store sequences of blocks, a plurality of the data blocks 125, and the data file 120. The second processor 401 is connected to the second memory 402 and executes software or software instructions that are capable of being stored in the second memory 402 (or another non-transitory computer readable medium such as another memory or a disc. Software included in some embodiments of the fountain code receiving device 210 may include, for example, firmware, one or more applications, program data, filters, rules, one or more program modules, and other executable instructions related to the control processes and methods described herein.

The second transceiver 405 sends and/or receives signals to and/or from one or more separate transceivers (for example, the first transceiver 320). Signals include, among other components, information, data, serial data, and data packets. The second transceiver 405 may be coupled to one or more separate transceivers via wired connections, fiber optic connections, and/or a wireless connections. The various communication protocols, networks, and connections described above may be utilized.

Figure 3:
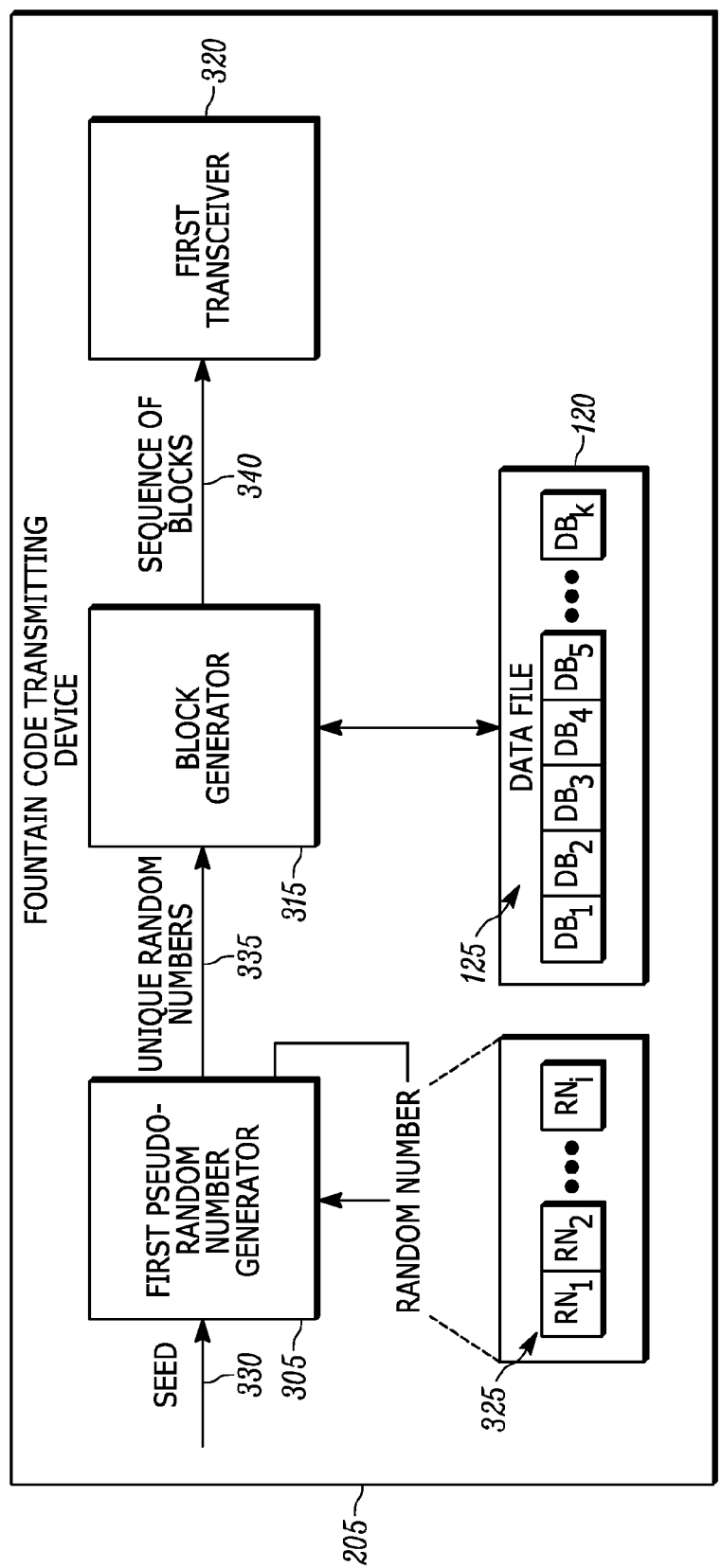
FIG. 3 is a block diagram of a fountain code transmitting device.

FIG. 3 illustrates an exemplary fountain code transmitting device 205 that includes, among other components, a first pseudorandom number generator 305, a block generator 315, a first transceiver 320, and the data file 120. The data file 120 includes a plurality of data blocks 125 (for example, k data blocks) as described above.

In some embodiments, the first pseudorandom number generator 305 generates a pseudorandom number based on an initial value or initial input (for example, a seed 330). The seed 330 may be generated in a number of ways including, for example, by using an initial value of a linear-feedback shift register or an initial value of a linear congruential generator. A suitable shift register or a linear congruential generator may be included as part of the first pseudorandom number generator 305.

In one embodiment, the first pseudorandom number generator 305 generates a random number 325 for each block in a sequence of blocks 340. In the illustrated embodiment, the random number 325 generated for the first block in the sequence of blocks 340 is the random number $RN_1$, and the random number 325 generated for the $i^{th}$ block in the sequence of blocks 340 is the random number $RN_i$. The sequence of blocks 340 is an ordered number of blocks based on a predetermined number (for example, a number stored in a memory of the fountain code transmitting device as described in greater detail below) or a random number (for example, the random number $RN_1$, a number based on the random number $RN_1$, or other suitable random number). The sequence of blocks 340 is similar to the plurality of communication blocks 130 as described above. However, unlike the plurality of communication blocks 130, the sequence of blocks 340 is linked to a first seed and a subsequent seed as described below.

The first pseudorandom number generator 305 generates the random number $RN_1$ for the first block in the sequence of blocks 340 based, at least in part, on a seed 330. In some embodiments, the first pseudorandom number generator 305 generates each subsequent random number $RN_2$ through $RN_i$ based at least in part on the previous random number $RN_{i-1}$. For example, the first pseudorandom number generator 305 generates a second random number $RN_2$ for a second block in the sequence of blocks 340 based in part on the first random number $RN_1$. Accordingly, the second random number $RN_2$ is also based, at least in part, on the seed 330. Similarly, for example, the first pseudorandom number generator 305 generates a third random number $RN_3$ for a third block in the sequence of blocks 340 based in part on the second random number $RN_2$ and the first random number $RN_1$. Accordingly, every subsequent random number $RN_4$ through $RN_i$ is also based at least in part on the seed 330.

The fountain code transmitting device 205 determines a degree d, $1 \leq d \leq k$ for each block in the sequence of blocks 340 based at least in part on the random number 325. The degree d specifies a quantity of unique random numbers 335 that need to be subsequently generated by the first pseudorandom number generator 305. In some embodiments, the degree d for a block in the sequence of blocks 340 is equal to a value of the random number 325 generated for each block in the sequence of blocks 340. In alternative embodiments, the fountain code transmitting device 205 determines the degree d for each block in the sequence of blocks 340 using an inverse transform sampling algorithm. Inverse transform sampling algorithms generate random numbers from a specified probability distribution.

The first pseudorandom number generator 305 draws random numbers to generate the plurality of unique random numbers 335 (for example, d unique random numbers) for each block in the sequence of blocks 340. The plurality of unique random numbers 335 for each block in the sequence of blocks 340 includes a quantity of random numbers that is equal to the degree d associated with the particular block in the sequence of blocks 340. As the degree d varies for each block in the sequence of blocks 340, each of the plurality of unique random numbers 335 includes a different quantity of unique random numbers. In some embodiments, the first pseudorandom number generator 305 uses the random number 325 generated for each block in the sequence of blocks 340, as another seed to generate the plurality of unique random numbers 335. The number of draws that the first pseudorandom number generator 305 makes for each block in the sequence of blocks 340 may be greater than d in order to generate the d unique random numbers. That is, to account for possible duplicate random numbers, the first pseudorandom number generator 305 may draw, for example, more than thirty-two random numbers when the degree is thirty-two.

The block generator 315 generates each block in the sequence of blocks 340 based on the plurality of unique random numbers 335. In one embodiment, each block in the sequence of blocks 340 includes a unique combination of multiple data blocks 125 from the data file 120. In some embodiments, the block generator 315 generates each block in the sequence of blocks 340 by combining (for example, using the bitwise exclusive-or (XOR) function) a selected subset of data blocks 125.

The first transceiver 320 transmits each sequence of blocks 340 generated by the block generator 315 with an associated seed. Initially, the first transceiver 320 transmits a first seed 345 associated with a first sequence of blocks 340. After transmitting the first seed 345 and the first sequence of blocks 340, the first transceiver 320 transmits a subsequent seed 350 that is based in part on the first seed 345. The subsequent seed 350 is associated with a second sequence of blocks 340 that is distinct from the first sequence of blocks 340. The subsequent seed 350 is considered to be the "first seed" associated with the second sequence of blocks 340. In some embodiments, the subsequent seed 350 aligns with the first seed 345 according to the number blocks in the sequence of blocks 340 (for example, the predetermined number or the random number as described above). In some embodiments, the first seed 345 is the seed 330, the first random number $RN_1$ associated with the first block in the sequence of blocks 340, or the last random number $RN_i$ associated with the last block from a previous sequence of blocks 340. In some embodiments, the subsequent seed 350 includes each random number 325 (for example, $RN_1$ through $RN_i$) associated with each block in the sequence of blocks 340 (except for the first random number $RN_1$ when the first seed 345 is the first random number $RN_1$). Alternatively, in some embodiments, the subsequent seed 350 includes the random number $RN_i$ associated with the last block in the sequence of blocks 340.

Figure 4:
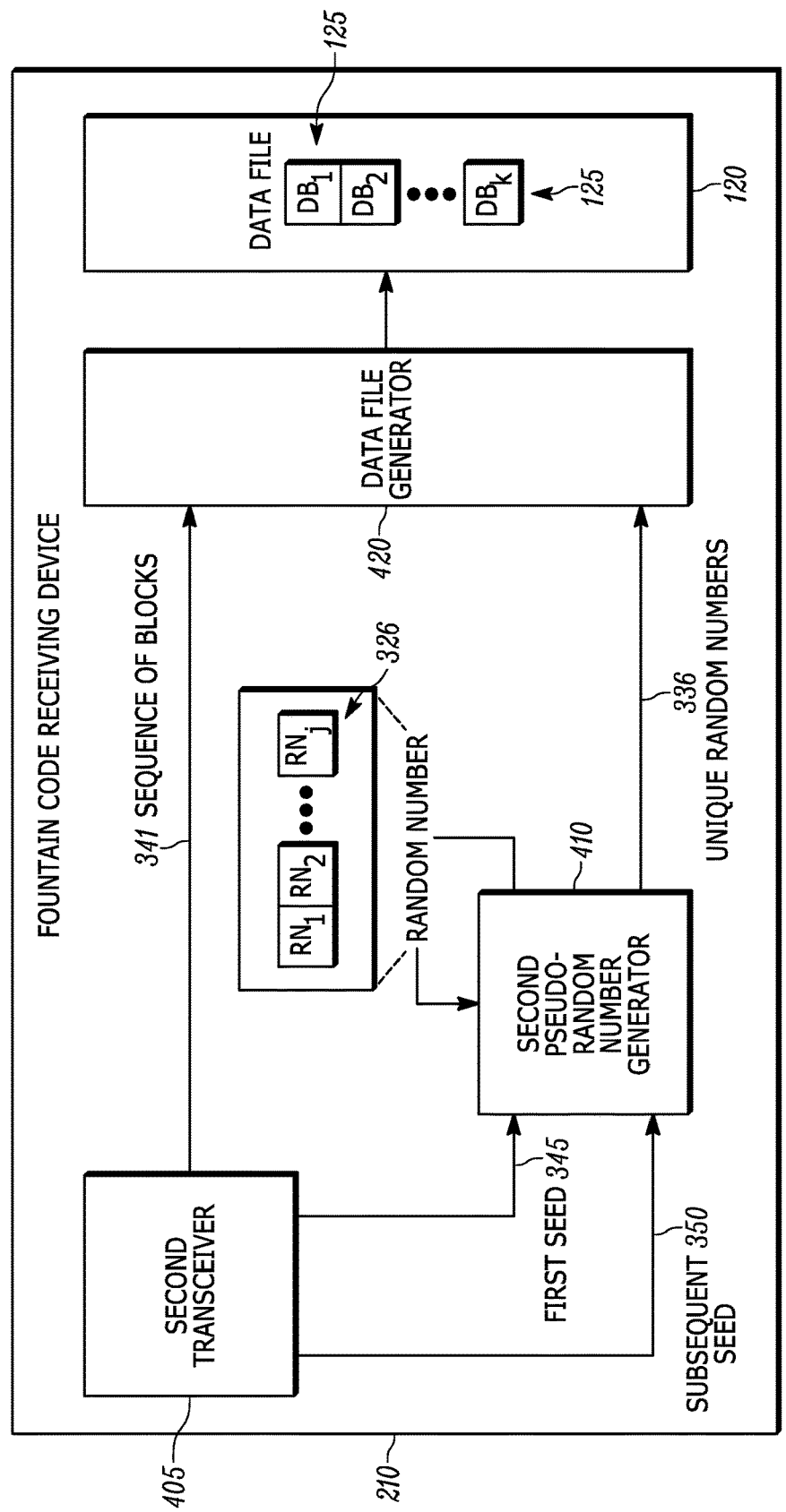
FIG. 4 is a block diagram of a fountain code receiving device.

FIG. 4 illustrates an exemplary fountain code receiving device 210 that includes, among other components, a second transceiver 405, a second pseudorandom number generator 410, and a data file generator 420. In some embodiments, the second pseudorandom number generator 410 is similar to the first pseudorandom number generator 305 as described above. For example, in some embodiments, the second pseudorandom number generator 410 includes a linear-feedback shift register with a feedback tap. In alternative embodiments, the second pseudorandom number generator 410 includes a linear congruential generator.

In some embodiments, the second transceiver 405 receives the first seed 345 and a sequence of blocks 341 that includes some or all of the sequence of blocks 340 from the first transceiver 320. The second transceiver 405 may also receive the subsequent seed 350 from the first transceiver 320. The second transceiver 405 may receive only some of the sequence of blocks 340 due to, for example, over-the-air errors. To verify that the second transceiver 405 has received all of the sequence of blocks 340 in the sequence of blocks 341, the fountain code receiving device 210 determines the validity of each sequence of blocks 341 using the first seed 345 and the subsequent seed 350. An erroneous sequence of blocks 341 is detected when the subsequent seed 350 does not align with first seed 345. As is described in greater detail below, the erroneous sequence of blocks 341 is discarded. This helps the fountain code receiving device 210 maintain synchronization with the fountain code transmitting device 205.

In some embodiments, when the first seed 345 is the initial input (for example, seed 330), the second pseudorandom number generator 410 generates a random number 326 for each block in the sequence of blocks 341 received by the second transceiver 405 based on the first seed 345. In the illustrated embodiment, the random number 326 generated for the first block in the sequence of blocks 341 is the random number $RN_1$, and the random number 326 generated for the $j^{th}$ block in the sequence of blocks 341 is the random number $RN_j$. When the second pseudorandom number generator 405 is synchronized with the first pseudorandom number generator 305, the random numbers $RN_1$ through $RN_j$ are same as the random numbers $RN_1$ through $RN_i$. Alternatively, when the first seed 345 is a random number (for example, the first random number $RN_1$), the second pseudorandom number generator 410 skips generating the first random number $RN_1$ and generates a random number 326 for each block received after the first block in the sequence of blocks 341 based on the first seed 345.

To determine whether the subsequent seed 350 aligns with the first seed 345, the second pseudorandom number generator 410 may compare each random number 325 included in the subsequent seed 350 to each random number 326 (for example, comparing $RN_1$ through $RN_i$ to $RN_1$ through $RN_j$). Alternatively, the second pseudorandom number generator 410 may compare the last random number 325 to the last random number 326 (for example, comparing $RN_i$ to $RN_j$).

When the above comparisons match, each block in the sequence of blocks 341 is considered to be valid. As a consequence, the entire sequence of blocks 341 is considered to be valid. The second pseudorandom number generator 410 then outputs the plurality of unique random numbers 336 (for example, a validation signal) for each block in the sequence of blocks 341 to the data file generator 420.

When the above comparisons do not match, each block in the sequence of blocks 341 is considered to be invalid. The entire sequence of blocks 341 is also considered to be invalid. The second pseudorandom number generator 410 outputs an error modified form of the plurality of unique random numbers 336 (for example, an invalidation signal) to the data file generator 420. It is not required that the second pseudorandom number generator 410 perform the comparison function. The comparison function may be performed by other components of the fountain code receiving device 210 including the data file generator 420 or the electronic processor described above.

The fountain code receiving device 210 detects whether there are missing or erroneous blocks in the sequence of blocks 341. When missing or erroneous blocks are detected, the fountain code receiving device 210 invalidates the sequence of blocks 341. In some embodiments, the determination of whether there are missing or erroneous blocks in the sequence of blocks 341 is based on whether a threshold amount of time elapses after the second transceiver 405 received the previous block in the sequence of blocks 341.

The fountain code receiving device 210 determines a degree d for each block in the sequence of blocks 341 based at least in part on the random number 326 generated or received by the second pseudorandom number generator 410. The second pseudorandom number generator 410 draws random numbers to generate the plurality of unique random numbers 336 (for example, d unique random numbers) for each block in the sequence of blocks 341. The second pseudorandom number generator 410 may use the random number 326 as an initial seed value to generate the plurality of unique random numbers 336 associated with each block in the sequence of blocks 341. The number of draws that the second pseudorandom number generator 410 makes for each plurality of unique random numbers 336 may be greater than d in order to generate the d unique random numbers.

In some embodiments, the second pseudorandom number generator 410 generates zeros for the plurality of unique random numbers 336 when the second transceiver 405 receives an erroneous block in the sequence of blocks 341. In other embodiments, the second pseudorandom number generator 410 generates the plurality of unique random numbers 336 only when the second transceiver 405 receives a sequence of blocks 341 that may validated as describe above.

The data file generator 420 identifies the subset of the data blocks 125 included in each block in a sequence of blocks 341 based, in part, on the plurality of unique random numbers 336, generated by the second pseudorandom number generator 410. For example, when the plurality of unique random numbers 336 for a block in the sequence of blocks 341 includes two, five, and seventeen, the data file generator 420 identifies that the block in the valid sequence of blocks 341 includes the second, fifth, and seventeenth data block from the data file 120 stored in the fountain code transmitting device 205. The data file generator 420 may store each of the identified data blocks 125 as a plurality of data blocks in the second memory 402, and eventually, the data file generator 420 receives enough information (for example, the plurality of data blocks 125 stored in the second memory 402 reach a threshold) to decode the data blocks 125 and reconstruct the data file 120 stored in a first memory of the fountain code receiving device 210.

Figure 5A:
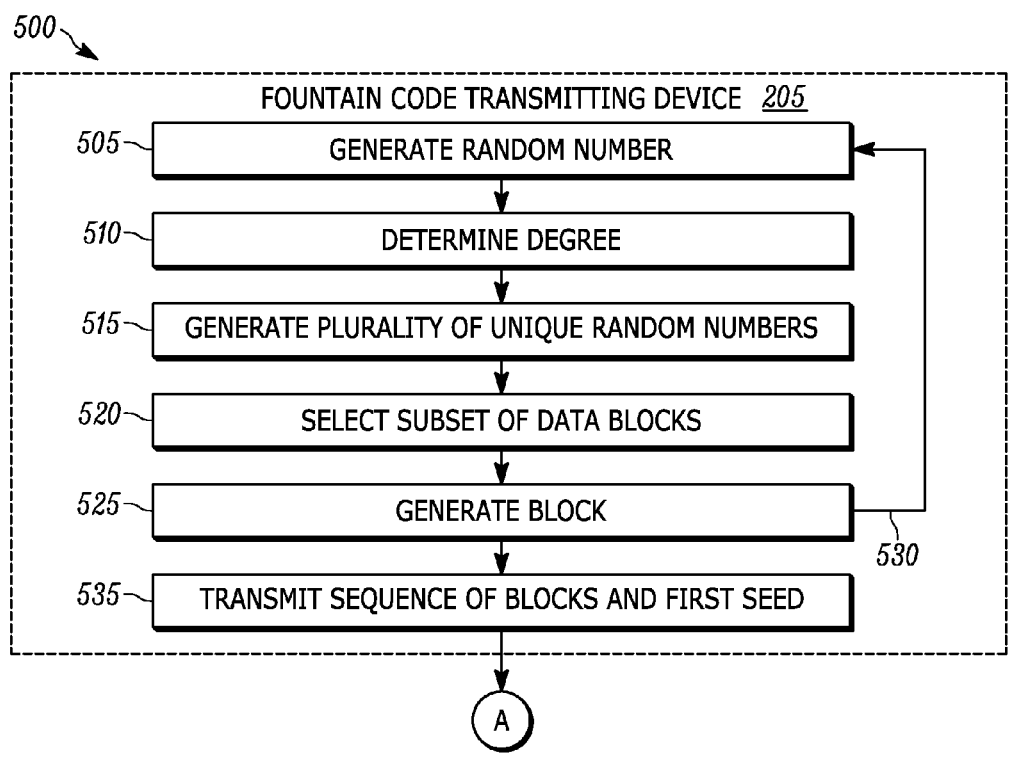
FIGS. 5A and 5B are flowcharts of a method for communicating a data file.
Figure 5B:
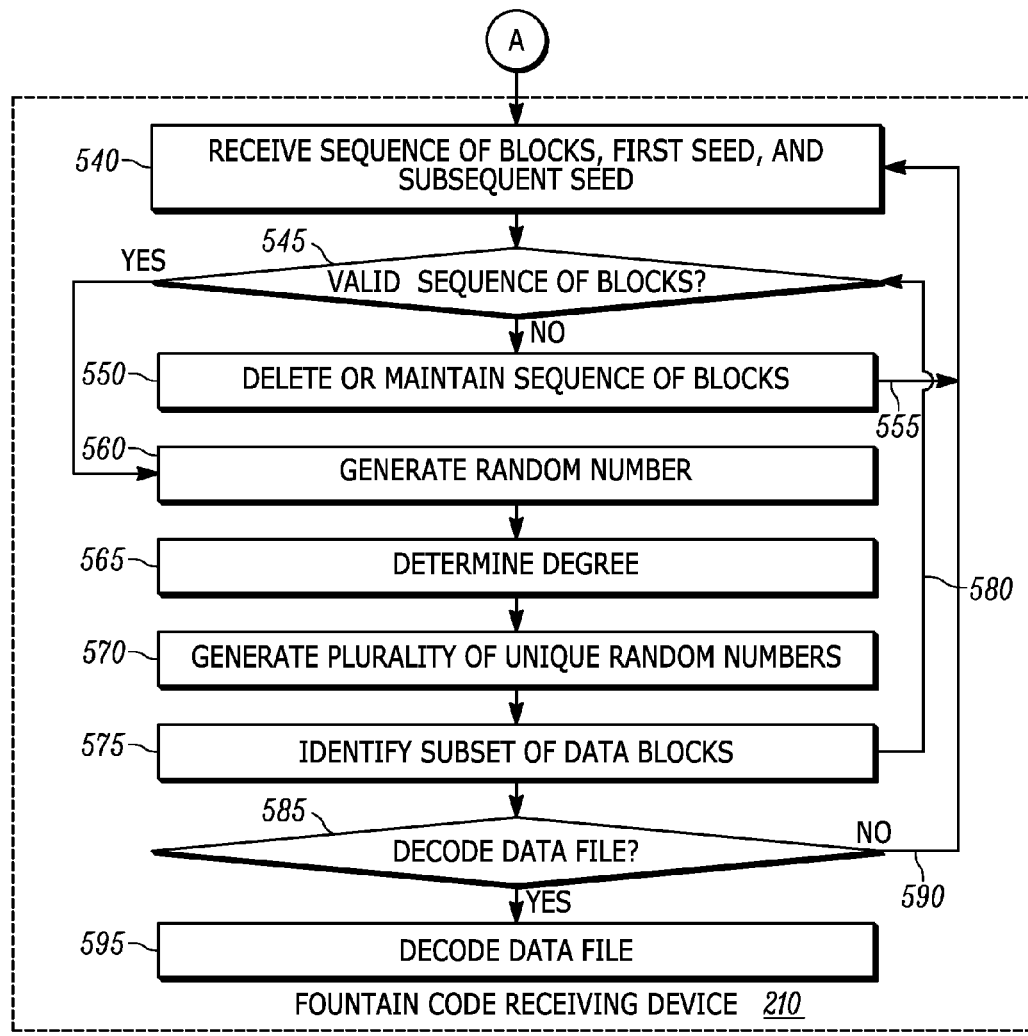

FIGS. 5A and 5B are flowcharts of a method 500 for communicating a data file 120. In the illustrated embodiment of FIG. 5A, the first pseudorandom number generator 305 of the fountain code transmitting device 205 generates first random number 325 based at least in part on the seed 330 (at block 505). The fountain code transmitting device 205 determines a degree d based at least in part on the random number 325 (at block 510). The first pseudorandom number generator 305 generates the plurality of unique random numbers 335 based at least in part on the degree d (at block 515). A block generator 315 of the fountain code transmitting device 205 selects a subset of the data blocks 125 from the data file 120 based on the plurality of unique random numbers 335 (at block 520). The block generator 315 generates a block based at least in part on the selected subset of the data blocks 125 (at block 525). The fountain code transmitting device 205 repeats the process until a sequence of blocks 340 is generated by the block generator 315 (loop 530). After generating the sequence of blocks 340, the fountain code transmitting device 205 transmits the sequence of blocks 340 and a first seed 345 (for example, the seed 330) with the first transceiver 320 (at block 535). The fountain code transmitting device 205 may then transmit subsequent sequences of blocks and subsequence seeds. In some embodiments, the process is continued until the fountain code transmitting device 205 receives a signal with the first transceiver 320 to stop transmitting the sequences of blocks (and associated seeds).

In the illustrated embodiment of FIG. 5B, the second transceiver 405 of the fountain code receiving device 210 receives a sequence of blocks 341 (including some or all of the sequence of blocks 340) and the first seed 345, and stores the sequence of blocks 341 in a second memory of the fountain code receiving device 210. The second transceiver 405 also receives a subsequent seed 350 (at block 540). The second transceiver 405 may also receive a subsequent sequence of blocks 341 associated with the subsequent seed 350. The fountain code receiving device 210 determines whether the sequence of blocks 341 is valid or invalid by determining whether the subsequent seed 350 aligns with the first seed 345 (at block 545) (as was described above).

When the fountain code receiving device 210 determines that the subsequent seed 350 does not align with the first seed 345, the fountain code receiving device 210 deletes the sequence of blocks 341 from the second memory 402 (at block 550). After deleting the sequence of blocks 341, the fountain code receiving device 210 receives at least the next sequence of blocks 341 and the next subsequent seed 350 (loop 555 to block 540) and stores the next sequence of blocks 341 in the second memory 402. The fountain code receiving device 210 again determines whether the sequence of blocks 341 is valid or invalid by determining whether the subsequent seed 350 aligns with the first seed 345 (at block 545) as described above and below.

In some cases, an error occurs and a seed is not received by the fountain code receiving device 210. For example, the first seed 345 or the subsequent seed 350 may be missing. When a seed is missing, the fountain code receiving device 210 maintains the sequence of blocks 341 in the second memory 402 (at block 550). While maintaining the sequence of blocks 341, the fountain code receiving device 210 receives at least the next sequence of blocks 341 and the next subsequent seed 350 (loop 555 to block 540) and stores the next sequence of blocks 341 and the next subsequent seed 350 in the second memory 402. The fountain code receiving device 210 again determines whether the sequences of blocks 341 are valid or invalid by determining whether the subsequent seed 350 aligns with the first seed 345 (at block 545). In some embodiments, the fountain code receiving device 210 may identify the lack of the subsequent seed 350 based on information within the next subsequent seed 350. In alternative embodiments, the fountain code receiving device 210 may identify the next subsequent seed 350 as being transmitted after a missing subsequent seed 350 based on a time delay associated with the receipt of the first seed 345 and the next subsequent seed 350.

When the fountain code receiving device 210 determines that the sequence of blocks 341 is valid, the second pseudorandom number generator 410 generates a random number 326 based at least in part on the first seed 345 (at block 560). The fountain code receiving device 210 determines the degree d based at least in part on the random number 326 (at block 565). The second pseudorandom number generator 410 generates the plurality of unique random numbers 336 based at least in part on the degree d (at block 570). The data file generator 420 identifies and extracts a subset of data blocks 125 included in the block of the sequence of blocks 341 based in part on the plurality of unique random numbers 336 and stores the subset of data blocks 125 in the second memory 402 (for example, as part of a plurality of data blocks 125 in the second memory 402) (at block 575). The fountain code receiving device 210 repeats the process for each of the blocks in the sequence of blocks 341 or sequences of blocks 341 (loop 580 to block 565). That is, regardless of the number of missing subsequent seeds 350, as long as there is a validation between at least one subsequent seed 350 and the first seed 345, any number of sequences of blocks 341 may be validated and processed by the fountain code receiving device 210.

In some embodiments, the data file generator 420 determines whether a data file 120 can be decoded from the plurality of the data blocks 125 stored in the second memory 402 (for example, determining whether the plurality of the data blocks 125 are sufficient or insufficient to decode the data file 120) (at block 585). When the fountain code receiving device 210 determines that the data file 120 cannot be decoded from the plurality of the data blocks 125 stored in the memory, the fountain code receiving device 210 receives at least the next sequence of blocks 341 and another subsequent seed 350 (loop 590 to block 540) and stores the sequence of blocks 341 in the second memory 402. In some embodiments, the subsequent seed 350 becomes the first seed 345 after receiving the next sequence of blocks 341.

When the fountain code receiving device 210 determines that the data file 120 can be decoded from the plurality of the data blocks 125 stored in the memory, the fountain code receiving device 210 decodes the data file 120 (at block 595). In some embodiments, the fountain code receiving device 210 transmits a stop signal to the fountain code transmitting device 205.

In some embodiments, blocks 505 through 535 and blocks 540 through 595 are performed in parallel. The fountain code transmitting device 205 performs blocks 505 through 535 in the illustrated embodiment of FIG. 5A and the fountain code receiving device 210 performs blocks 540 through 595 in the illustrated embodiment of FIG. 5B.

Although the foregoing has been described in the context of a system with a fountain code transmitting device and a fountain code receiving device, the embodiments discussed may be applied to other systems. A data communication system may implement the embodiments discussed to provide a reduced control signaling mechanism. For example, a "carousel" system where the data of the data file is transmitted multiple times may implement a system similar to the system described above.

In a carousel system, data (e.g., an image) is split into many equal size blocks which are then sent in sequence over and over again until each receiving device has received all the blocks. In a carousel system, the receiving device is required to know the address or index of each block, so that the receiving device can correctly place each block in the data as the receiving device reconstructs the data. However, rather than transmitting the address or index with every block, control signals holding a reference (e.g., the first seed and subsequent seeds as described above) may be transmitted periodically. The control signals may be validated prior to committing the data (e.g., the sequences of blocks as described above).

Figure 6:
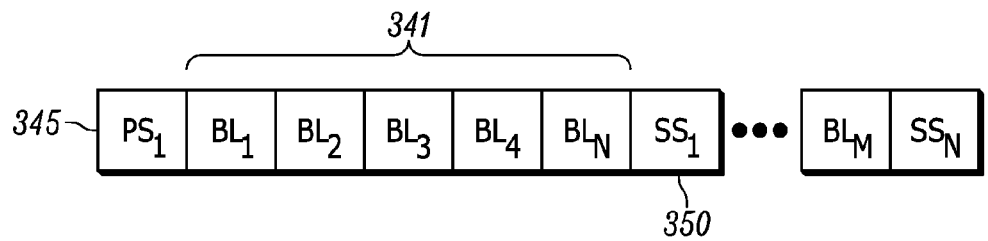
FIG. 6 is a data stream of a first seed, a sequence of blocks, and a subsequent seed.

FIG. 6 is a data stream of the first seed 345, the sequence of blocks 341, and the subsequent seed 350. In the example of FIG. 6, the fountain code receiving device 210 receives the first seed 345, the sequence of blocks 341, and the subsequent seed 350 as described above. In the example of FIG. 6, the subsequent seed 350 aligns with the first seed 345. As a result, the fountain code receiving device 210 validates the sequence of blocks 341. The fountain code receiving device 210 continues to receive additional sequences of blocks ($FP_M$) and additional subsequent seeds ($SS_N$) and perform the method 500 until there are enough of the data blocks 125 in the plurality of data blocks 125 stored in the second memory 402 to decode the data file 120. In some embodiments, the subsequent seed 350 becomes the first seed 345 after receiving the next sequence of blocks 341.

Figure 7:
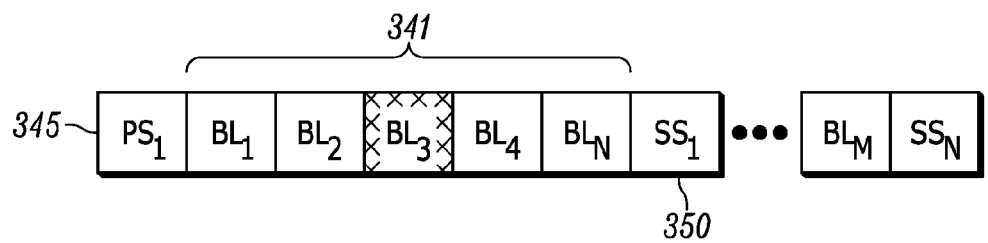
FIG. 7 is a data stream of a first seed, a sequence of blocks including an erroneous or missing block, and a subsequent seed.

FIG. 7 is a data stream of a first seed, a sequence of blocks including an erroneous or missing block, and a subsequent seed. In the example of FIG. 7, the fountain code receiving device 210 receives the first seed 345, the sequence of blocks 341 including an erroneous or missing block (as illustrated in FIG. 7 as the third block ($BL_3$)), and the subsequent seed 350 as described above. In the example of FIG. 7, the subsequent seed 350 does not align with the first seed 345 because the third block ($BL_3$) is erroneous or missing, which allows the fountain code receiving device 210 to invalidate and delete the sequence of blocks 341 from the second memory 402. As described above and illustrated in FIG. 7, the fountain code receiving device 210 continues to receive additional sequences of blocks ($FP_M$) and additional subsequent seeds ($SS_N$) and perform the method 500 as described above until there are enough of the data blocks 125 in the plurality of data blocks 125 to decode the data file 120. In some embodiments, as described above, the subsequent seed 350 becomes the first seed 345 after receiving the next sequence of blocks 341.

Figure 8:
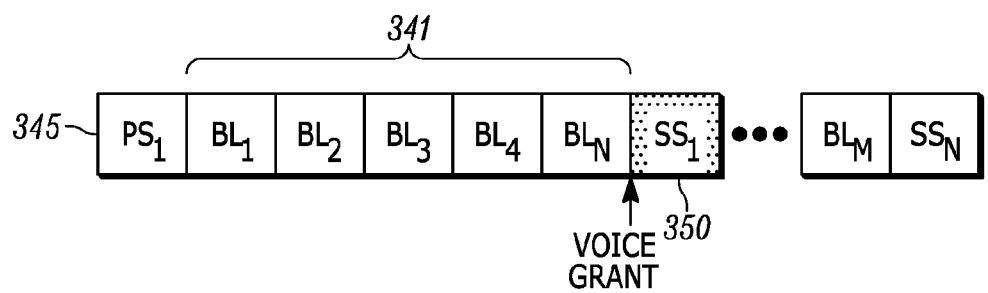
FIG. 8 is a data stream of a first seed, a sequence of blocks, and a missing subsequent seed.

FIG. 8 is a data stream of a first seed, a sequence of blocks, and a missing subsequent seed. In the example of FIG. 8, the fountain code receiving device 210 receives the first seed 345 and the sequence of blocks 341, and does not receive the first iteration of the subsequent seed 350 as described above. For example, the fountain code receiving device 210 does not receive the first iteration of the subsequent seed 350 because the second transceiver 405 of the fountain code receiving device 210 receives a parallel data session (for example, a voice communication or "Voice Grant" as illustrated in FIG. 8) or location information. In the example of FIG. 8, the missing subsequent seed 350 prevents the fountain code receiving device 210 from validating or invalidating the sequence of blocks 341 stored in the second memory 402.

In some embodiments, the fountain code receiving device 210 may identify a missing subsequent seed 350 based on the receipt of the next subsequent seed. Alternatively, in some embodiments, the fountain code receiving device 210 may identify the missing subsequent seed 350 based on time delay between the first seed 345 and the next subsequent seed 350. Further, in some embodiments, the fountain code receiving device 210 considers the missing subsequent seed 350 to invalidate the sequence of blocks 341. Accordingly, the fountain code receiving device 210 invalidates and deletes the sequence of blocks 341 from the second memory 402. However, the missing subsequent seed 350 cannot become the first seed 345 for the next sequence of blocks 341. Thus, in these embodiments, the fountain code receiving device 210 invalidates all sequences of blocks 341 until the next first seed 345 is received or until the next subsequent seed 350 is received and becomes the first seed 345.

In alternative embodiments, the fountain code receiving device 210 ignores the missing subsequent seed 350. Accordingly, the fountain code receiving device 210 maintains the sequence of blocks 341 in the second memory 402 and receives the next subsequent seed 350 with the next sequence of blocks 341. The fountain code receiving device 210 may use the next subsequent seed 350 to validate or invalidate the sequence of blocks 341 maintained in the second memory 402 in addition to the next sequence of blocks 341 (i.e., validate or invalidate the sequences of blocks 341). When the next subsequent seed 350 does not align with the first seed 345, the fountain code receiving device 210 may invalidate and delete the sequence of blocks 341 maintained in the memory in addition to the next sequence of blocks 341. Conversely, when the next subsequent seed 350 aligns with the first seed 345, the fountain code receiving device 210 may validate and store the sequence of blocks 341 maintained in the memory in addition to the next sequence of blocks 341. As described above and illustrated in FIG. 8, the fountain code receiving device 210 continues to receive additional sequences of blocks ($FP_M$) and additional subsequent seeds ($SS_N$) and perform the method 500 as described above until there are enough of the data blocks 125 in the plurality of data blocks 125 stored in the second memory 402 to decode the data file 120.

Figure 9:
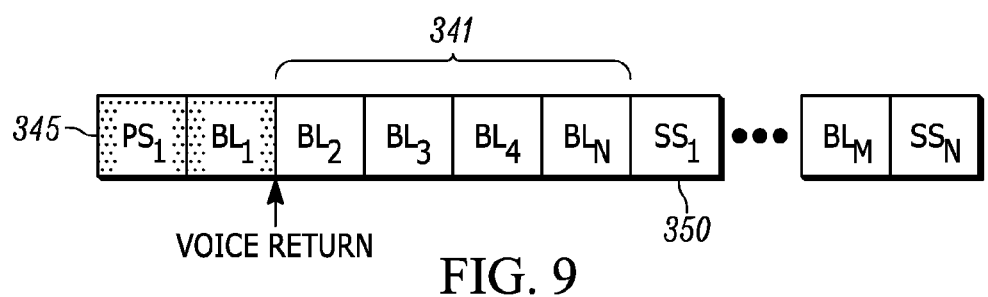
FIG. 9 is a data stream of a missing first seed, a sequence of blocks, and a subsequent seed.

FIG. 9 is a data stream of a missing first seed, a sequence of blocks, and a subsequent seed. In the example of FIG. 9, the fountain code receiving device 210 receives a second portion of the sequence of blocks 340 as the sequence of blocks 341 and the subsequent seed 350, but does not receive the first seed 345 and a first portion of the sequence of blocks 340. For example, the second transceiver 405 of the fountain code receiving device 210 does not receive the first seed 345 and the first portion of the sequence of blocks 340 because the second transceiver 405 is linked to a parallel data communication (for example, a voice communication or "Voice Return" as illustrated in FIG. 8) or linked to location information. In the example of FIG. 9, the missing first seed 345 prevents the fountain code receiving device 210 from performing the method 500 as described above. Accordingly, the fountain code receiving device 210 invalidates and deletes the sequence of blocks 341 from the second memory 402. However, the subsequent seed 350 may become the first seed 345 for the next sequence of blocks 341. Thus, the fountain code receiving device 210 may perform the method 500 with the next sequence of blocks 341. As described above and illustrated in FIG. 9, the fountain code receiving device 210 continues to receive additional sequences of blocks ($FP_M$) and additional subsequent seeds ($SS_N$) and perform the method 500 as described above until there are enough of the data blocks 125 in the plurality of data blocks 125 stored in the second memory 402 to decode the data file 120.

Figure 10A:
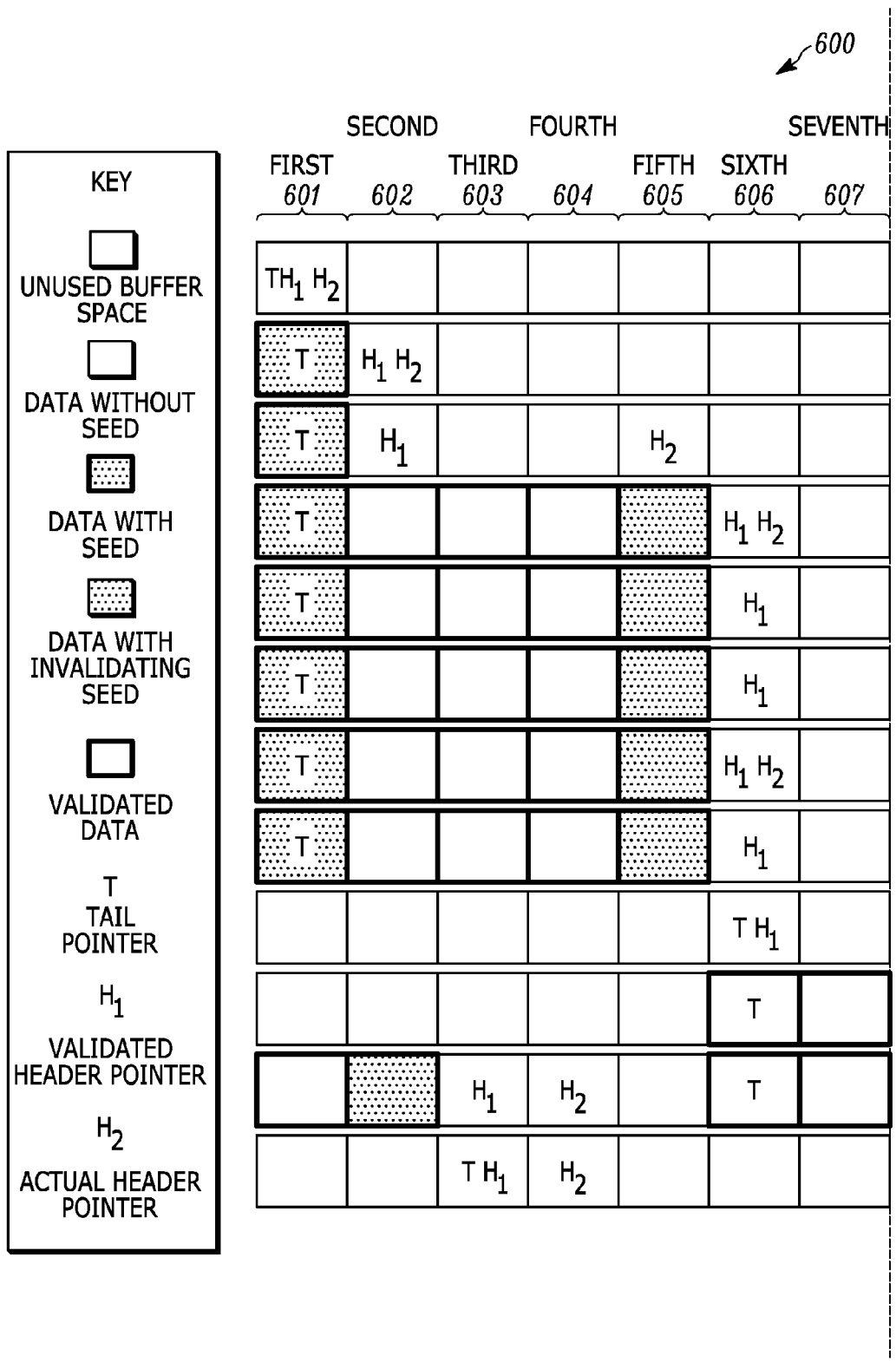
FIGS. 10A and 10B are functional block diagrams of a method for operating a circular buffer of a fountain code receiving device.
Figure 10B:
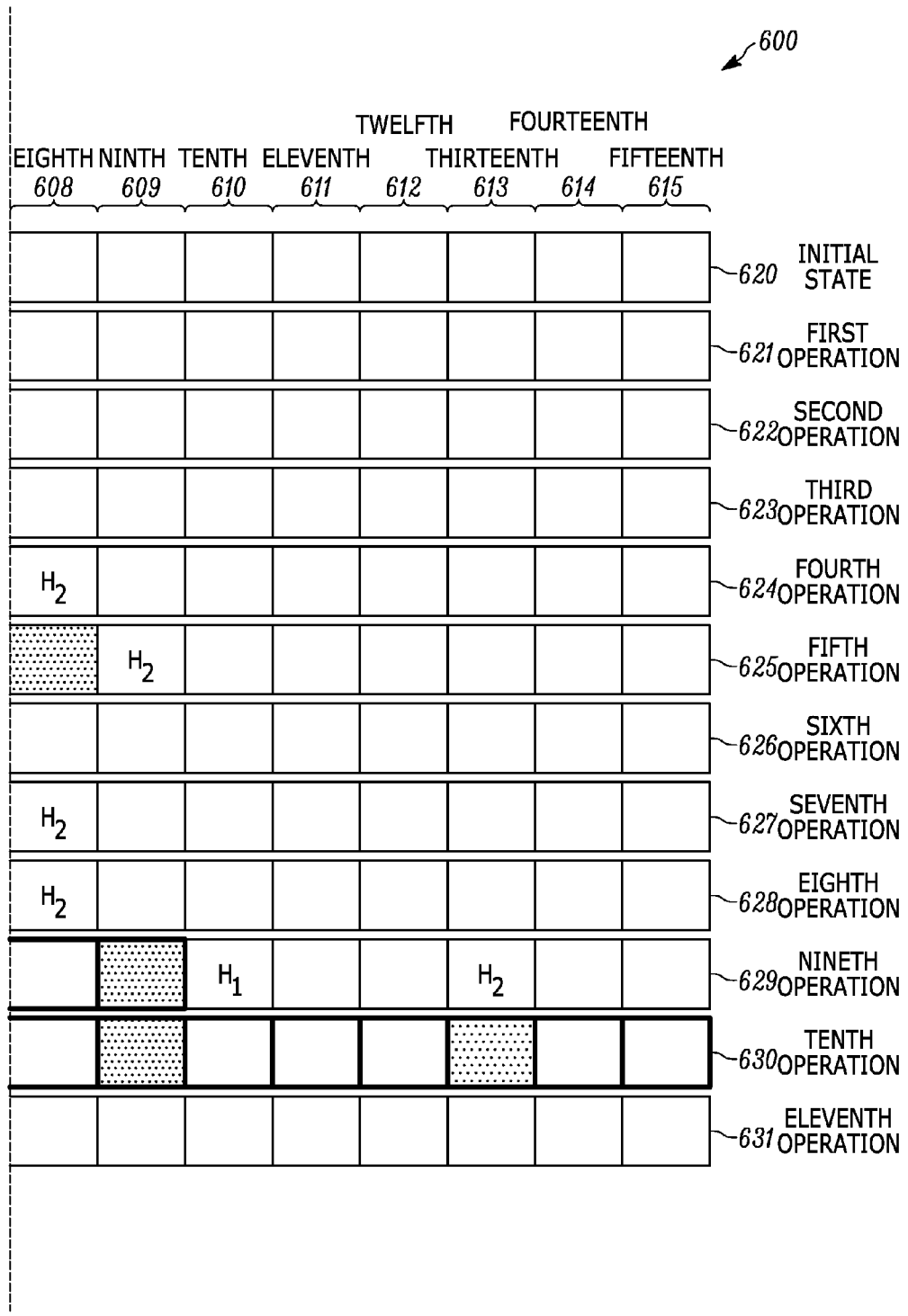

FIGS. 10A and 10B are functional block diagrams of a method for operating a circular buffer 600 of a fountain code receiving device 210. In the example of FIGS. 10A and 10B, the circular buffer 600 includes fifteen buffer spaces 601 through 615. The initial state 620 of the circular buffer 600, as illustrated in FIGS. 10A and 10B, is empty and all fifteen buffer spaces 601 through 615 are unused buffer spaces, and the first buffer space 601 also includes the tail pointer T, the validated header pointer H1, and the actual header pointer H2.

The tail pointer T indicates an initial position from which all data is read from upon validation of the data. Each commitment of data (e.g., a read operation) advances the tail pointer T. The validated header pointer H1 points to the next buffer space after validated data. The actual header pointer H2 points to the next unused buffer spaces where new data may be written.

In a first operation 621, the circular buffer 600 receives a valid first seed (for example, the data with seed as illustrated in FIGS. 10A and 10B) as described above. The tail pointer T remains at the first buffer space 601 because the data has not been committed. The validated header pointer H1 and the actual header pointer H2 both advance to the second buffer space 602 because data has been received and is valid.

In a second operation 622, the circular buffer 600 receives a sequence of blocks as described above (e.g., data without a seed as illustrated in FIGS. 10A and 10B) and stores each block in the sequence of blocks in the second, third, and fourth buffer spaces 602 through 604, respectively. The tail pointer T remains at the first buffer space 601 because the data has not been committed. The validated header pointer H1 remains at the second buffer space 602 because the data stored in the second through fourth buffer spaces 602 through 604 has not been validated. The actual header pointer H2 advances to the fifth buffer space 605 because the data was stored in the second through fourth buffer spaces 602 through 604.

In a third operation 623, the circular buffer 600 receives a subsequent seed as described above (e.g., the data with seed as illustrated in FIGS. 10A and 10B) and stores the subsequent seed in the fifth buffer space 605. The subsequent seed in the fifth buffer space 605 aligns with the first seed and validates the data in the second, third, and fourth buffer spaces 602 through 604. However, the tail pointer T remains at the first buffer space 601 because the data has not been committed. The validated header pointer H1 and the actual header pointer H2 both advance to the sixth buffer space 606 because the data has been stored in the fifth buffer space 605 and validated through the fifth buffer space 605.

In a fourth operation 624, the circular buffer 600 receives the sequence of blocks as described above (e.g., data without a seed as illustrated in FIGS. 10A and 10B) and stores the sequence of blocks in the sixth and seventh buffer spaces 606 and 607. The tail pointer T remains at the first buffer space 601 because the data has not been committed. The validated header pointer H1 remains in the sixth buffer space 606 because the data stored in the sixth and seventh buffer spaces 606 and 607 has not been validated. The actual header pointer H2 advances to the eighth buffer space 608 because data has been stored in the sixth and seventh buffer spaces 606 and 607.

In a fifth operation 625, the circular buffer 600 receives a subsequent seed as described above (e.g., the data with seed as illustrated in FIGS. 10A and 10B) and stores the subsequent seed in the eighth buffer space 608. The tail pointer T remains at the first buffer space 601 because the data has not been committed. The validated header pointer H1 remains in the sixth buffer space 606 because the data stored in the sixth and seventh buffer spaces 606 and 607 has not been validated. The actual header pointer H2 advances to the ninth buffer space 609 because data has been stored in the eighth buffer space 608.

In a sixth operation 626, the circular buffer 600 discards the data stored in the sixth and seventh buffer spaces 606 and 607 because the subsequent seed does not align with the first seed or the previous subsequent seed. This misalignment invalidates the data stored in the sixth and seventh buffer spaces 606 and 607. The tail pointer T remains at the first buffer space 601 because the data has not been committed. The validated header pointer H1 and the actual header pointer H2 revert back to the sixth buffer space 606 because the data stored in the sixth and seventh buffer spaces 606 and 607 has been discarded.

In a seventh operation 627, the circular buffer 600 receives a sequence of blocks as described above (e.g., data without a seed as illustrated in FIGS. 10A and 10B) and stores the sequence of blocks in the sixth and seventh buffer spaces 606 and 607. The tail pointer T remains at the first buffer space 601 because the data has not been committed. The validated header pointer H1 remains in the sixth buffer space 606 because the data stored in the sixth and seventh buffer spaces 606 and 607 has not been validated. The actual header pointer H2 advances to the eighth buffer space 608 because the data has been stored in the sixth and seventh buffer spaces 606 and 607.

In an eighth operation 628, the circular buffer 600 commits the validated data in the first through fifth buffer spaces 601 through 605 (e.g., read out to permanent memory storage). The tail pointer T advances to the sixth buffer space 606 because the data has been committed. The validated header pointer H1 remains in the sixth buffer space 606 because the data in the sixth and seventh buffer spaces 606 and 607 has not been validated. The actual header pointer H2 remains in the eighth buffer space 608 because no new data has been stored in the unused buffer spaces of the circular buffer 600.

In a ninth operation 629, the circular buffer 600 receives a sequence of blocks as described above (e.g., data without a seed as illustrated in FIGS. 10A and 10B) and stores the sequence of blocks in the eighth, tenth, eleventh, and twelfth buffer spaces 608 through 612. Additionally, in the ninth operation 629, the circular buffer 600 receives a subsequent seed as described above (e.g., the data with seed as illustrated in FIGS. 10A and 10B) and stores the subsequent seed in the ninth buffer space 609. The subsequent seed in the ninth buffer space 609 aligns with the last seed committed to memory. This alignment validates the data in the sixth, seventh, eighth, and ninth buffer spaces 606 through 609. The tail pointer T remains at the sixth buffer space 606 because the data has not been committed. The validated header pointer H1 advances to the tenth buffer space 610 because the data stored in the sixth, seventh, eighth, and ninth buffer spaces 606 through 609 has been validated. The actual header pointer H2 advances to the thirteenth buffer space 613 because data has been stored in the eighth through twelfth buffer spaces 608 through 612.

In a tenth operation 630, the circular buffer 600 receives two sequences of blocks and stores the first sequence of blocks in the fourteenth, fifteenth, and first buffer spaces 614 through 601, and stores the second sequence of blocks in the third buffer space 603. Additionally, in the tenth operation 630, the circular buffer 600 receives two subsequent seeds and stores the subsequent seeds in the thirteenth and second buffer spaces 613 through 602. A first subsequent seed aligns with either the first seed, or the two previously received subsequent seeds and validates the data stored in the tenth, eleventh, and twelfth buffer spaces 610 through 612. The second subsequent seed aligns with either the first seed, or the three previously received subsequent seeds and validates the data stored in the fourteenth, fifteenth, and first buffer spaces 614 through 601. The tail pointer T remains at the sixth buffer space 606 because the data has not been committed. The validated header pointer H1 advances to the third buffer space 603 because the data stored in tenth through second buffer spaces 610 through 602 has been validated. The actual header pointer H2 advances to the fourth buffer space 604 because data has been stored in the tenth through third buffer spaces 610 through 603.

In an eleventh operation 631, the circular buffer 600 commits the validated data. The tail pointer T advances to the third buffer space 603 because the data stored in the sixth through second buffer spaces 606 through 602 has been committed. The validated header pointer H1 remains at the third buffer space 603 because none of the data has been validated. The actual header pointer H2 remains at the fourth buffer space 604 because no new data has been received. The circular buffer 600 continues to perform operations similar to the operations described above until enough data has been committed to permanent memory that allows a data file generator to decode a data file from the committed data.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A wireless communication device for receiving a data file in a communication system, the wireless communication device comprising:
    a transceiver configured to send and receive data to and from a wireless communication network;
    a memory;
    an electronic processor electrically coupled to the transceiver and the memory, the electronic processor configured to
        receive, with the transceiver, a first seed over the wireless communication network,
        receive, with the transceiver, a first sequence of blocks and a second sequence of blocks transmitted over the wireless communication network,
        receive, with the transceiver, a second subsequent seed over the wireless communication network,
        identify whether the second subsequent seed was transmitted after a first subsequent seed that was not received at the wireless communication device,
        determine whether the second subsequent seed aligns with the first seed,
        cause the memory to delete the first sequence of blocks and the second sequence of blocks from the memory in response to determining that the second subsequent seed does not align with the first seed, and
        decode the data file from a plurality of received blocks including the first sequence of blocks and the second sequence of blocks based at least in part on the first seed after determining that the second subsequent seed aligns with the first seed.

2. The wireless communication device of claim 1, wherein the electronic processor is further configured to
   extract data blocks from one or more sequences of blocks including the first sequence of blocks and the second sequence of blocks maintained in the memory,
   cause the memory to store the data blocks as a plurality of data blocks in the memory, and
   determine whether the plurality of data blocks is sufficient to decode the data file, and
   wherein the electronic processor is configured to decode the data file by decoding the data file from the plurality of data blocks stored in the memory in response to determining that the plurality of data blocks is sufficient.

3. The wireless communication device of claim 1, wherein the electronic processor is further configured to
   receive, with the transceiver, a parallel data session prior to receiving the second subsequent seed, and
   cause the memory to delete the first sequence of blocks and the second sequence of blocks in response to receiving the parallel data session prior to receiving the second subsequent seed.

4. The wireless communication device of claim 1, wherein the wireless communication device is a fountain code receiving device, and wherein the first seed, the first sequence of blocks, the second sequence of blocks, and the second subsequent seed are part of a fountain code transmitted by a fountain code transmitting device.

5. The wireless communication device of claim 1, wherein the electronic processor is further configured to generate a sequence of pseudo-random numbers based on the first seed,
   wherein the electronic processor is configured to determine whether the second subsequent seed aligns with the first seed by comparing the second subsequent seed to at least one pseudo-random number from the sequence of pseudo-random numbers,
   wherein the first sequence of blocks and the second sequence of blocks are received as fountain codes, and
   wherein the electronic processor is configured to decode the data file using the sequence of pseudo-random numbers and the plurality of received blocks.

6. The wireless communication device of claim 5, wherein the electronic processor is configured to use the second subsequent seed only to determine whether the second subsequent seed aligns with the first seed and the electronic processor does not use the second subsequent seed received with the transceiver in decoding the data file.

7. A method of receiving a data file with a wireless communication device in a communication system, the method comprising:
   receiving, at a transceiver of a wireless communication device, a first seed over a wireless communication network;
   receiving, at the transceiver, a first sequence of blocks and a second sequence of blocks transmitted over the wireless communication network;
   receiving, at the transceiver, a second subsequent seed over the wireless communication network;
   identifying, with an electronic processor of the wireless communication device, whether the second subsequent seed was transmitted after a first subsequent seed that was not received at the wireless communication device;

determining, with the electronic processor, whether the second subsequent seed aligns with the first seed;
when the second subsequent seed does not align with the first seed, deleting the first sequence of blocks and the second sequence of blocks from the memory; and
decoding the data file from a plurality of received blocks including the first sequence of blocks and the second sequence of blocks based at least in part on the first seed after determining that the second subsequent seed aligns with the first seed.

8. The method of claim 7, further comprising:
extracting, with the electronic processor, data blocks from one or more sequences of blocks including the first sequence of blocks and the second sequence of blocks maintained in the memory;
storing, in the memory, the data blocks as a plurality of data blocks;
determining, with the electronic processor, whether the plurality of data blocks is sufficient to decode the data file; and
responsive to determining that the plurality of data blocks is insufficient to decode the data file, performing the previous steps until the plurality of data blocks is sufficient to decode the data file,
wherein decoding the data file includes decoding, with the electronic processor, the data file from the plurality of data blocks stored in the memory in response to determining that the plurality of data blocks is sufficient to decode the data file.

9. The method of claim 7, further comprising
receiving, at the transceiver, a parallel data session prior to receiving the second subsequent seed; and
responsive to receiving the parallel data session prior to receiving the second subsequent seed, deleting the first sequence of blocks and the second sequence of blocks from the memory.

10. The method of claim 7, wherein the wireless communication device is a fountain code receiving device, and wherein the first seed, the first sequence of blocks, the second sequence of blocks, and the second subsequent seed are part of a fountain code transmitted by a fountain code transmitting device.

11. A wireless communication device for receiving a data file in a communication system, the wireless communication device comprising:
   a transceiver configured to send and receive data to and from a wireless communication network;
   a memory;
   an electronic processor electrically coupled to the transceiver and the memory, the electronic processor configured to
      receive, with the transceiver, a first seed over the wireless communication network,
      receive, with the transceiver, a first sequence of blocks and a second sequence of blocks transmitted over the wireless communication network,
      receive, with the transceiver, a second subsequent seed over the wireless communication network,
      identify whether the second subsequent seed was transmitted after a first subsequent seed that was not received at the wireless communication device,
      when the second subsequent seed is transmitted after the first subsequent seed that was not received at the wireless communication device, cause the memory to delete the first sequence of blocks and the second sequence of blocks from the memory, when the second subsequent seed is not transmitted after the first subsequent seed that was not received at the wireless communication device, determine whether the second subsequent seed aligns with the first seed, and when the second subsequent seed does not align with the first seed, cause the memory to delete the first sequence of blocks and the second sequence of blocks from the memory.

12. The wireless communication device of claim 11, wherein the electronic processor is further configured to extract data blocks from one or more sequences of blocks including the first sequence of blocks and the second sequence of blocks maintained in the memory, cause the memory to store the data blocks as a plurality of data blocks in the memory, determine whether the plurality of data blocks is sufficient to decode a data file, and when the plurality of data blocks is sufficient, decode the data file from the plurality of data blocks stored in the memory.

13. The wireless communication device of claim 11, wherein the electronic processor is further configured to receive, with the transceiver, a parallel data session prior to receiving the second subsequent seed, and cause the memory to delete the first sequence of blocks and the second sequence of blocks in response to receiving the parallel data session prior to receiving the second subsequent seed.

14. The wireless communication device of claim 11, wherein the wireless communication device is a fountain code receiving device, and wherein the first seed, the first sequence of blocks, the second sequence of blocks, and the second subsequent seed are part of a fountain code transmitted by a fountain code transmitting device.

15. A method of receiving a data file with a wireless communication device in a communication system, the method comprising:

receiving, at a transceiver of a wireless communication device, a first seed over a wireless communication network;

receiving, at the transceiver, a first sequence of blocks and a second sequence of blocks transmitted over the wireless communication network;

receiving, at the transceiver, a second subsequent seed over the wireless communication network;

identifying, with an electronic processor of the wireless communication device, whether the second subsequent seed was transmitted after a first subsequent seed that was not received at the wireless communication device;

when the second subsequent seed is transmitted after the first subsequent seed that was not received at the wireless communication device, deleting the first sequence of blocks and the second sequence of blocks from the memory, when the second subsequent seed is not transmitted after the first subsequent seed that was not received at the wireless communication device, determining, with the electronic processor, whether the second subsequent seed aligns with the first seed; and when the second subsequent seed does not align with the first seed, deleting the first sequence of blocks and the second sequence of blocks from the memory.

16. The method of claim 15, further comprising:

extracting, with the electronic processor, data blocks from one or more sequences of blocks including the first sequence of blocks and the second sequence of blocks maintained in the memory;

storing, in the memory, the data blocks as a plurality of data blocks;

determining, with the electronic processor, whether the plurality of data blocks is sufficient to decode a data file;

responsive to determining that the plurality of data blocks is insufficient to decode the data file, performing the previous steps until the plurality of data blocks is sufficient to decode the data file; and responsive to determining that the plurality of data blocks is sufficient to decode the data file, decoding, with the electronic processor, the data file from the plurality of data blocks stored in the memory.

17. The method of claim 15, further comprising receiving, at the transceiver, a parallel data session prior to receiving the second subsequent seed; and responsive to receiving the parallel data session prior to receiving the second subsequent seed, deleting the first sequence of blocks and the second sequence of blocks from the memory.

18. The method of claim 15, wherein the wireless communication device is a fountain code receiving device, and wherein the first seed, the first sequence of blocks, the second sequence of blocks, and the second subsequent seed are part of a fountain code transmitted by a fountain code transmitting device.

* * * * *